United States Patent [19]
Komatsu et al.

[11] 3,923,699
[45] Dec. 2, 1975

[54] CYCLOHEXADECENONE-5 PERFUME COMPOSITIONS

[75] Inventors: Akira Komatsu, Tokyo; Toshio Yoshida, Yokohama; Susumu Akutagawa, Tokyo; Fumitaka Norose, Yokohama; Takeshi Yamamoto, Yokohama; Ikuji Kumasa, Yokohama, all of Japan

[73] Assignee: Takasago Perfumery Co., Ltd., Tokyo, Japan

[22] Filed: Dec. 29, 1971

[21] Appl. No.: 213,818

[30] Foreign Application Priority Data
Dec. 29, 1970 Japan.............................. 45-126904

[52] U.S. Cl............................. 252/522; 260/586 A
[51] Int. Cl.$^2$...................... A61K 7/46; C07C 49/44
[58] Field of Search.................. 260/586 A; 252/522

[56] References Cited
UNITED STATES PATENTS

| | | | |
|---|---|---|---|
| 2,916,517 | 12/1959 | Casella................................ | 252/522 |
| 3,235,601 | 2/1966 | Parsons et al...................... | 252/522 |

FOREIGN PATENTS OR APPLICATIONS

| | | | |
|---|---|---|---|
| 135,921 | 10/1929 | Switzerland.................... | 260/586 A |

OTHER PUBLICATIONS

Chem. Abst., Vol. 70 (1969), pp. 943S & 88108V.
Miyake et al., – Chem. Abst., Vol. 76 (1972), p. 153244b.
Kumasa et al., – Chem. Abst., Vol. 77 (1972), p. 126143g.

*Primary Examiner*—Sam Rosen
*Attorney, Agent, or Firm*—Sughrue, Rothwell, Mion, Zinn & Macpeak

[57] ABSTRACT

A musk perfume composition containing the novel compound cyclohexadecenone-5. The novel compound is prepared by reacting cyclododecene epoxide with vinyl magnesium chloride to provide 2-vinylcyclododecanol-1, oxidizing the product to provide 2-vinylcyclododecanone-1, reacting the 2-vinyl-cyclododecanone-1 with vinyl magnesium chloride to provide 1,2-divinylcyclododecanol-1, and decomposing the 1,2-divinylcyclododecanol-1 with heat to cyclohexadecenone-5. And 1,2-divinylcyclododecanol-1 is also prepared by reacting cyclododecanone with chlorine to provide α-chloro-cyclododecanone, reacting the α-chloro-cyclododecanone-1 with vinyl magnesium chloride to provide 1,2-divinylcyclododecanol-1.

1 Claim, No Drawings

CYCLOHEXADECENONE-5 PERFUME COMPOSITIONS

BACKGROUND OF THE INVENTION

The present invention relates to a novel compound, cyclohexadecenone-5, and a process for producing the novel compound. The invention further relates to a perfume composition containing cyclohexadecenone-5 as a main component.

DESCRIPTION OF THE PRIOR ART

Among compounds having a musk-like odor, the most valuable ones are natural muscone and natural civetone. The former being a large ring ketone having 15 carbon atoms and the latter being a large ring ketone having 17 carbon atoms. However, because they are quite expensive, various attempts for synthesizing these compounds and discovering substitutes for these compounds have been made, and as a result thereof it has been confirmed that large ring ketones having a musk-like odor have from 14 to 19 carbon atoms.

Although such large ring ketones are excellent compounds as musk perfumes, the production of such compounds is expensive due to the difficulty of the production of them and the fact that the yield is low. Accordingly, various investigations have been made to discover substitutes having other structures for such large ring ketones for use in musk perfumes, for example, aromatic nitromusks, indane musks, tetralin musks and isochroman musks have been employed as musk perfumes.

SUMMARY OF THE INVENTION

As a result of various investigations to provide at low cost musk perfume compositions containing large ring ketones, the inventors have found that the novel compound cyclohexadecenone-5 having 16 carbon atoms and an unsaturated bond, represented by the formula $$\begin{array}{l}\text{CH}-(\text{CH}_2)_{10}\\ \parallel \phantom{xxxxxxxxx} \\ \text{CH}-(\text{CH}_2)_3-\text{C}=\text{O}\end{array}\quad(I)$$

has a musk-like odor, and also that the compound can be readily prepared by using as the starting material cyclododecene epoxide or cyclododecanone which is recently available as petrochemical products. Among large ring ketones having 16 carbon atoms, only cyclohexadecenone-8 and cyclohexadecanone have hitherto been reported.

The primary object of this invention is, therefore, to provide cyclohexadecenone-5 having a musk-like odor.

Another object of this invention is to provide a process for producing cyclohexadecenone-5 profitably in industry.

Still other object of this invention is to provide an excellent musk perfume composition containing cyclohexadecenone-5 as the main component.

Other objects of this invention will become apparent from the following descriptions.

DETAILED DESCRIPTION OF THE INVENTION

According to the process of this invention, cyclohexadecenone-5 is produced by the following reaction formulae:

a. Production from cyclododecene epoxide:

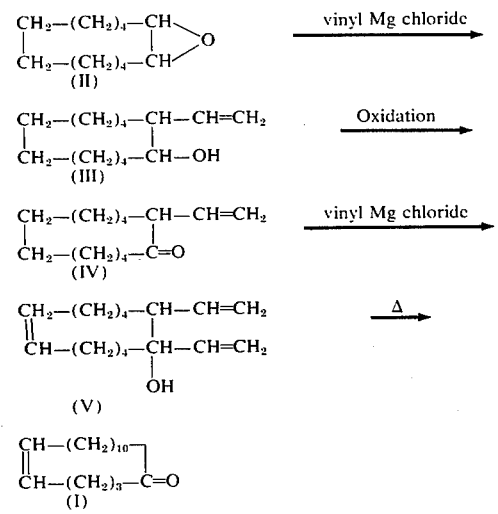

b. Production from cyclododecanone:

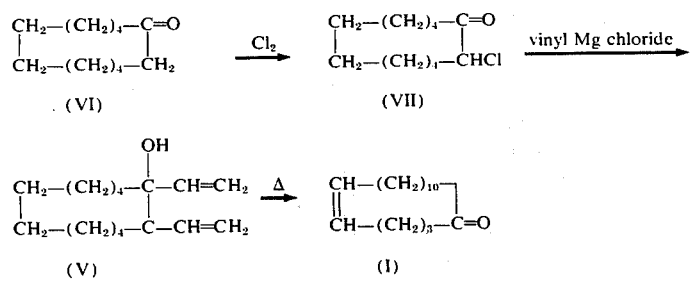

That is, according to process (a) shown above, cyclohexadecenone (I) is produced by reacting cyclododecene epoxide (II) with vinyl magnesium chloride to provide 2-vinylcyclododecanol-1 (III), oxidizing the product (III) to provide 2-vinylcyclododecanone-1 (IV), reacting product (IV) with vinyl magnesium chloride to provide 1,2-divinylcyclododecanol-1 (V), and decomposing 1,2-divinylcyclododecanol-1 with heat to yield cyclohexadecenone-5.

Vinyl magnesium chloride used in the reaction of this invention may be prepared in tetrahydrofuran as solvent according to the process described in the specification of British Patent No. 777,158.

In the above-mentioned process of this invention, the reaction of producing 2-vinylcyclododecanol-1 (III) from cyclododecene epoxide (II) and the reaction of producing 1,2-divinylcyclododecanol-1 (V) from 2-vinylcyclododecanone-1 (IV) are conducted in accordance with the general Grignard's reaction conditions using the vinyl magnesium chloride prepared by the above process.

It is preferable to oxidize 2-vinylcyclododecanol-1 (III) to 2-vinylcyclododecanone-1 (IV) under mild conditions, for example, better results are obtained when the oxidation is carried out employing a Jones reagent (cf., L. F. Fieser and M. Fieser; "Reagents for Organic Synthesis", page 142 (1967), published by John Wiley and Sons, Inc.) for oxidizing with chromic acid in acetone.

1,2-divinylcyclododecanol-1 (V) may be converted to cyclohexadecenone-5 (I) by thermal decomposition according to the oxy-Cope rearrangement described by E. N. Marvell and W. Whalley (Tetrahedron Letters No. 7, PP. 509–512, (1970) ). The thermal decomposition to produce cyclohexadecenone-5 (I) from 1,2-divinylcyclododecanol-1 (V) is preferably carried out in an inert gas atmosphere by heating 1,2-divinylcyclododecanol-1 to 180°–250°C, preferably 210°–220°C for about 3 hours in the lack of a solvent or in a proper solvent such as cyclododecatriene.

According to process (b) of this invention, cyclohexadecenone-5 (I) is obtained by reacting cyclododecanone (VI) with chlorinating agent to provide α-chloro-cyclododecanone-1 (VII), reacting the product (VII) with vinyl magnesium chloride to provide 1,2-divinyl-cyclododecanol-1 (V), and decomposing 1,2-divinylcyclododecanol-1 with heat to cyclohexadecenone-5.

In process (b) of this invention, the chlorination to produce α-chloro-cyclododecanone-1 (VII) from cyclododecanone (VI) is carried out by a chlorination method capable of chlorinating the α-position of the ketone for example, by a method in which chlorine gas is directly reacted with cyclododecanone (VI) or a method in which cupric chloride is reacted with cyclododecanone (VI) in dimethylformamide (cf., e.g., Journal of Organic Chemistry; Vol. 28, 630 (1963) ). In particular, it is preferred to react chlorine gas in an amount of 1–1.2 times the stoichiometric amount at a temperature of 0°–40°C, preferably at about 25°C using tetrahydrofuran as the solvent.

In addition, the reaction of producing 1,2-divinylcyclododecanol-1 (V) from α-chloro-cyclododecanone-1 (VII) is conducted in accordance with the general Grignard's reaction conditions using the vinyl magnesium chloride prepared by the above process. Ketone radical is more reactive than chloro radical for the Grignard reagent, and so 1 mole of the Grignard reagent is first reacted at room temperature over a 1 hour and then 1 more mole of the Grignard reagent is reacted at about 60°C for a few hours, e.g. for about 2 to 3 hours, while agitating. Then the reaction product is treated with aqueous solution of ammonium chloride under ice-cooling to produce 1,2-divinylcyclododecanol-1 (V) and the reaction of producing cyclohexadecenone-5 (I) from 1,2-divinylcyclododecanol-1 (V) is carried out in the same manner as stated in aforesaid process (a).

In the case of the chlorination with cupric chloride, 1 mole of cyclododecanone is reacted with 2.4 moles of cupric chloride at 25°C using dimethylformamide as a solvent.

Cyclohexadecenone-5 (I) prepared by the present invention has a floral-sweet musk-like odor with an ambergris-like undertone (ambergris is a typical animal-note perfume compound like musk compounds) is more animal-like than many other synthetic musk compounds and has good long-lasting and fixative qualities.

Thus, perfume compositions containing cyclohexadecenone-5 of this invention as an olfactory and fixative ingredient may be used per se or may be incorporated into materials such as cosmetic creams, lotions, powders, soaps, detergents and aerosols on other toilet goods such as shampoos.

The process for producing the novel compound of this invention will now be described practically by the following examples together with the application thereof as perfume compositions.

I. Production of cyclohexadecenone-5

EXAMPLE 1

Preparation of 2-vinylcyclododecanol-1 (III)

Into a 1 liter four-necked flask was placed, under a nitrogen gas atmosphere, 0.6 moles of vinyl magnesium chloride, preliminary prepared in tetrahydrofuran as a solvent. After distilling off the tetrahydrofuran at a temperature of 40°C and a pressure of 1mm.Hg, 300 ml of benzene was added to the system. Then, a solution of 91 g (0.5 moles) of cyclododecene epoxide in 100 ml of benzene was added dropwise to the mixture at 30°C over a 1 hour period. Thereafter, the reaction mixture was stirred for 36 hours at 55°C and the reaction product was added to an aqueous ammonium chloride solution under ice-cooling and then extracted with diethyl ether. By subjecting the diethyl ether extract to distillation under reduced pressure, there was obtained 32.5 g of a fraction which distilled between 116°–118°C/0.5 mm.Hg. Yield: 39%.

Infrared absorption spectra: 3350 and 1060 cm$^{-1}$ (showing secondary OH) and 3060, 1635, 990, and 905 cm$^{-1}$ (showing —CH=CH$_2$).

MS spectra: Primary peak m/e 184($C_{12}H_{24}O$), p-H$_2$O 164($C_{12}H_{22}$).

Elementary analysis as $C_{12}H_{24}O$:
Calculated: C,78.10%; H 13.22%.
Found: C,77.91%; H 13.15%.

EXAMPLE 2

Preparation of 2-vinylcyclododecanone-1 (IV)

Into a 1 liter four-necked flask were placed 6.2 g of 2-vinylcyclododecanol-1 and 600 g of acetone, and after adding dropwise (under a nitrogen gas atmosphere) 18 ml of a Jones reagent (prepared by adding 26.72 parts by weight of chromic oxide and 23 parts by volume of concentrated sulfuric acid to 100 parts by volume of water under ice-cooling, while agitating) at a temperature of 10°–12°C, the mixture was stirred for 10 minutes. The reaction product was poured onto ice and extracted with n-hexane. By subjecting the n-hexane extract to fractional distillation, 4.3 g of a fraction which distilled between 106°–107°C/0.2 mm.Hg was obtained at a yield of 69%.

IR absorption spectra: 1720 cm$^{-1}$ (showing >C=O) and 3055, 1632, 995, and 907 cm$^{-1}$ (showing —CH=CH$_2$).

MS spectraum: Primary peak m/e 208($C_{14}H_{24}O$)
Elementary analysis as $C_{14}H_{24}O$:
Calculated: C,80.77%; H,11.40%.
Found: C,80.57%; H,11.27%.

EXAMPLE 3

Preparation of 1,2-divinylcyclododecanol-1 (V)

Into a 200 milliliter four-necked flask were placed under a nitrogen gas atmosphere, 0.024 moles of vinyl magnesium chloride, preliminarily prepared in the presence of tetrahydrofuran as the solvent and 50 ml of tetrahydrofuran and thereafter 10 ml of a tetrahydrofuran solution of 3.6 g (0.02 moles) of 2-vinylcyclododecanone-1 was added dropwise to the mixture at room temperature. After the addition, the reaction mixture was further stirred for 3 hours at room temperature and the reaction product thus obtained was added to an aqueous solution of ammonium chloride under ice-cooling. Then, the product was extracted with diethyl ether. By subjecting the diethyl ether extract to a fractional distillation under reduced pressure, 3.7 g of a fraction which distilled between 138°–140°C/0.5 mm.Hg was obtained with a yield of 95%.

IR absorption spectra: 3355 cm$^{-1}$ and 1115 cm$^{-1}$ (showing tertiary OH) and 3065, 1645, 990, and 905 cm$^{-1}$ (showing —CH=CH$_2$).

MS spectra: Primary peak m/e 236 ($C_{16}H_{28}O$) p-H$_2$O 218($C_{16}H_{26}$).

Elementary analysis as $C_{16}H_{28}O$:
Calculated: C,83.06%; H 11.87%.
Found: C,82.98%; H 11.60%.

EXAMPLE 4

Preparation of cyclohexadecenone-5 (I)

Into a 100 milliliter four-necked flask were placed 3.4 g of 1,2-divinylcyclododecanol-1 and 30 g of cyclododecatriene as a solvent and then the mixture was heated to 210°–220°C for 3 hours under a nitrogen gas atmosphere. The reaction product was passed through a column chromatograph packed with silica gel to catch the reaction product and the reaction product thus adsorbed was developed. After distilling off cyclododecatriene and hydrocarbons as side products from the elute, the reaction product was extracted with a n-hexane-ethyl acetate (9:1) solvent. By distilling the extract, 2.3 g of a fraction was obtained with a yield of 71%.

IR absorption spectra: 1702 cm$^{-1}$ (showing >C=O) and 1650, 962, and 720 cm$^{-1}$ (showing —CH=cH—).

MS spectra: Primary peak m/e 236 ($C_{16}H_{28}O$)
Base ion peak 55 ($H_2C=CH—C \equiv O$).
NMR (60 Hz, CCl$_4$, TMS)
—CH$_2$— 1.34 ppm

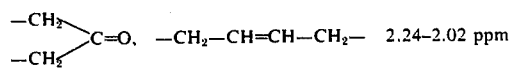
C=O, —CH$_2$—CH=CH—CH$_2$— 2.24–2.02 ppm

—CH=CH— 5.42 ppm
Elementary analysis as $C_{16}H_{28}O$:
Calculated: C83.06%; H,11.87%.
Found: C,82.95%; H,11.60%.
Boiling point: 155°C/2 mm.Hg.
Melting point of the semicarbazone: 176°C.

EXAMPLE 5

Preparation of α-chloro-cyclododecanone-1 (VII)

i. Into a 500 milliliter four-necked flask were placed 75 g of cyclododecanone and 75 ml of tetrahydrofuran, and the mixture was stirred by blowing chlorine gas (1.2 mole times that of the cyclododecanone) into the mixture for 2 hours. The reaction product was washed with water and then with an aqueous sodium carbonate solution, and then subjected to rectification to provide 92.7 g of a fraction which distilled at 119°C/1 mm.Hg with a yield of 91%.

IR absorption spectra: 1715 cm$^{-1}$ (showing >C=O) and 718 cm$^{-1}$ (showing C—Cl).

MS spectrum: Primary peak 216 ($C_{12}H_{21}OCl$)
Elementary analysis as $C_{12}H_{21}OCl$:
Calculated: C,66.51%; H,9.70%; Cl,16.40%.
Found: C,66.43%; H,9.68%; Cl,16.38%.
Melting point: 58.9°C ii. Into 300 ml of dimethylformamide there was dissolved 24.5 g (1.44 moles) of cupric chloride dihydrate at 70°C and after further adding to the solution 30.6 g (0.72 moles) of lithium chloride followed by stirring, 109.2 g (0.6 moles) of cyclododecanone was added dropwise to the mixture at 85°C over a 1 hour period. Then, after stirring the mixture for 2 hours, the reaction product was treated with ice water, extracted with toluene, and the toluene extract was distilled to provide 109 g (85%) of a fraction which distilled between 133°–135°C/2 mmHg.

EXAMPLE 6

Preparation of 1,2-divinylcyclododecanol-1 (V)

Into a 500 milliliter four-necked flask there was placed 100 ml of a tetrahydrofuran solution of 36.4 g (0.2 moles) of α-chloro-cyclododecanone-1, and then 0.24 moles of vinyl magnesium chloride preliminary prepared in tetrahydrofuran as a solvent was added dropwise to the solution of 20°C over a period of 30 minutes under a nitrogen gas atmosphere to cause the reaction. To the reaction product solution which was obtained there was added a catalytic amount of aluminum isopropoxide (1 g). Then 0.26 moles of vinyl magnesium chloride was added dropwise to the mixture at 60°C over a 1 hour period. After stirring the reaction system for a further 2 hours, the reaction product was treated as in the preparation (III) in Example 2 to provide 30.3 g of a fraction which distilled between 138°–140°C/0.5 mm.Hg with a yield of 76%. The physical properties of the product were completely the same as those of the product obtained in Example 3.

II. Perfume compositions

EXAMPLE 7

A chypre perfume compositions: (The "parts" are by weight.)

| | Parts |
|---|---|
| Bergamot oil | 260 |
| Ylang-Ylang oil | 50 |
| Clary sage oil | 30 |
| Linalool | 30 |
| Jasmin absolute | 20 |
| Rose de mai absolute | 20 |
| Gamma-methyl ionone | 50 |
| Iso-eugenol | 30 |
| Patchouli oil | 20 |
| Sandalwood oil | 80 |
| Oakmass absolute | 60 |
| Vetiver oil | 60 |
| Heliotropine | 40 |
| Cumarin | 90 |
| Vanillin | 20 |
| Benzoin Siam resin | 50 |
| Cyclohexadecenone-5 | 70 |
| | 1000 |

EXAMPLE 8

Lilac-type perfume: (The "parts" are by weight.)

| | Parts |
|---|---|
| Phenyl ethyl alcohol | 235 |
| Benzyl acetate | 100 |
| Anis aldehyde | 65 |
| Cinnamic alcohol | 95 |
| Lilial (A registered trade name and manufactured by Givaudan Corp. in U.S.A.) | 320 |
| Iso-eugenol | 10 |
| Amyl cinnamic aldehyde | 40 |
| Phenylacetaldehyde 5% in ethyl phthalate | 5 |
| Terpineol | 70 |
| Cyclohexadecenone-5 | 60 |
| | 1000 |

EXAMPLE 9

Opopanax-type perfume: (The "parts" are by weight.)

| | Parts |
|---|---|
| Heliotropine | 4 |
| Coumarin | 12 |
| Vanillin | 13 |
| Benzoin Siam | 5 |
| Olibanum resin | 7 |
| Oakmoss absolute | 2 |
| Patchouli oil | 2 |
| Sandalwood oil | 4 |
| Vetiver oil | 4 |
| Jasmin absolute | 2 |
| Dihydrojasmone | 2 |
| Linalyl acetate | 7 |
| Geranium oil | 5 |
| Lemon oil | 2 |
| Orange oil | 2 |
| Mandarin oil | 1 |
| Bergamot oil | 16 |
| Cyclohexadecenone-5 | 10 |
| | 100 |

What is claimed is:
1. A perfume composition having a musk-like odor comprising an olfactory amount of cyclohexadecenone-5 in combination with a conventional perfume.

* * * * *